United States Patent

[11] 3,559,820

[72] Inventor William A. Munson
 Williamsville, N.Y.
[21] Appl. No. 822,491
[22] Filed May 7, 1969
[45] Patented Feb. 2, 1971
[73] Assignee Westinghouse Electric Corporation
 Pittsburgh, Pa.
 a corporation of Pennsylvania

[54] SYSTEM FOR AUTOMATING BLAST FURNACE SCALE CAR
 13 Claims, 3 Drawing Figs.
[52] U.S. Cl. .................................................. 214/2, 214/41,
 214/19, 214/41; 246/122; 340/282
[51] Int. Cl. ......................................................... B65g 3/20,
 B65g 67/06
[50] Field of Search .......................................... 214/2, 18,
 19, 38, 41; 340/282; 246/122

[56] References Cited
 UNITED STATES PATENTS
 2,936,911 5/1960 Fath et al. ...................... 214/38

3,128,070 4/1964 Harris et al. .................. 340/282X

Primary Examiner—Robert G. Sheridan
Attorneys—F. H. Henson, R. G. Brodahl and M. F. Oglo ABSTRACT: Described is a system for automating scale cars of the type used to receive materials from storage hoppers, weigh those materials, and charge them into blast furnace skip cars. The system is characterized in having means for comparing electrical signals indicative of the actual position of the scale car, and the actual weight of materials charged into the scale car, with signals proportional to the desired car position and desired weight of materials to be charged. In this manner, the comparing means is effective to automatically stop the scale car at the correct bin position, open the discharge chute of the bin above the scale car until the desired weight is reached, and then move the scale car to a position beneath another bin or to a discharge position, all of this being determined by indicia on a punch card, computer program or the like which produces the aforesaid signals proportional to desired car position and weight.

SYSTEM FOR AUTOMATING BLAST FURNACE SCALE CAR

BACKGROUND OF THE INVENTION

As is known, a scale car is a device, usually mounted on tracks, which receives materials to be charged into a blast furnace, weighs those materials, and then travels to a discharge position where its contents are emptied into a blast furnace skip car. At present, most scale cars are manually operated with the operator standing on the car itself. The operator, by means of controls, determines the direction in which the car is to travel, when it should stop, how much material is to be loaded into the car, and which of two skip cars into which the material is to be loaded. In addition, he opens the doors at the bottom of the storage bins above the scale car and records the weights of the various materials for future analysis. Needless to say, this is a somewhat unsatisfactory operation in that it requires a full time operator who can make errors in judgment or in recording weights.

SUMMARY OF THE INVENTION

As an overall object, the present invention seeks to provide a new and improved system for automatically controlling a scale car of the type described above.

More specifically, an object of the invention is to provide an automatic control for a scale car by comparison of actual and desired position signals, and actual and desired weight signals.

In accordance with the invention, a scale car control system is provided comprising a device for reading and storing indicia on a punch card, tape, computer program or the like relative to the bin or bins to which the scale car should travel and the weight of the material to be charged into the car from each bin. This indicia is converted into electrical signals which are then compared in suitable comparators with signals proportional to the actual position of the scale car and the actual weight of the material therein. When, for example, the output of the position comparator is zero, it is known that the scale car is beneath the bin dictated by the indicia on the punch card or other storage means. Furthermore, when the output of the position comparator is zero, the chute at the bottom of a storage bin above the scale car is opened to discharge a portion of its contents into the scale car. As the material is discharged into the scale car, the increasing weight of the car is converted into an electrical signal of increasing magnitude which is compared with the desired weight signal determined by the indicia on the punch card or other similar device. Again, when the output of the weight comparator is zero, it is known that the desired weight is now in the scale car; the chute at the bottom of the storage bin is closed; and the scale car is moved to another bin or to a discharge position where its contents are automatically discharged into a blast furnace skip car.

Preferably, the means for producing an electrical signal proportional to actual position incorporates pulse generating means, such as an inductive pickup on the scale car, which produces a pulse each time it passes an opening in a metal rail extending parallel to the scale car track. The resulting pulses are then counted, either up or down depending upon the direction of movement of the scale car, in a binary counter. The output of the counter is then compared with a digital signal, derived from a punch card or the like, which will match the count of the counter when the scale car has reached a desired position.

The above and other objects and features of the invention will become apparent from the following detailed description taken in connection with the accompanying drawings which form a part of this specification, and in which.

Figure 1:
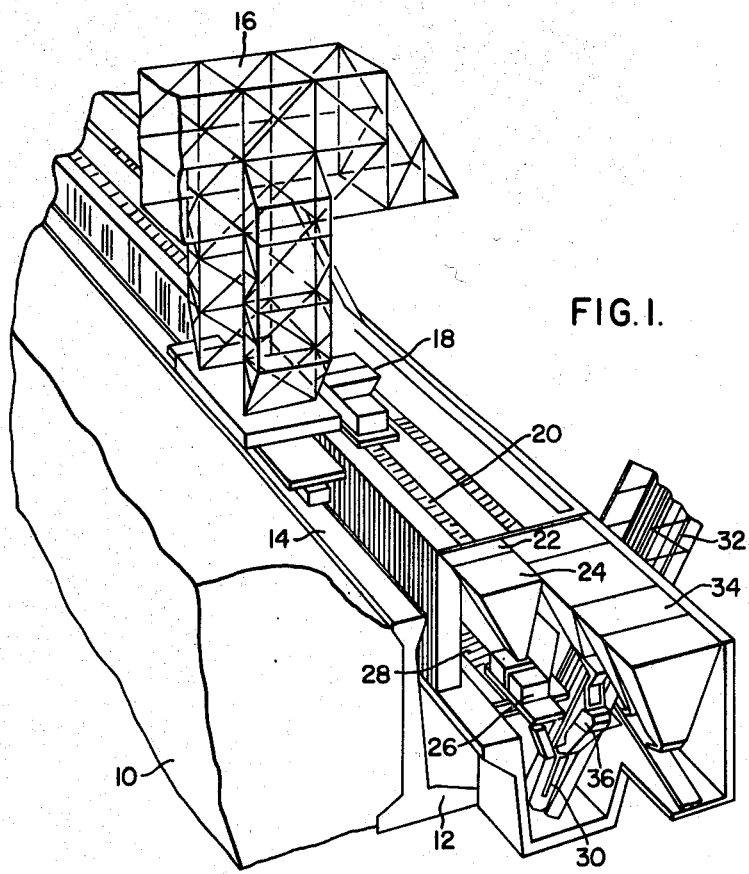
FIG. 1 is a schematic illustration of a typical system for charging materials into blast furnace skip cars and shows the function and location of a scale car in such a system.

With reference now to the drawings, and particularly to FIG. 1, a typical system is shown for charging iron ore, limestone and coke into a blast furnace. Iron ore in area 10 is stored behind an ore bridge pier 12 provided at its upper extremity with tracks 14 on which one end of a traveling ore bridge 16 travels. The ore bridge 16 is provided with a transversely-moving crane, now shown, which transfers iron ore from the storage area 10 to a transfer car 18 which travels on tracks 20 and transfers materials to iron ore and limestone storage bins 22 and 24, respectively.

Beneath the bins 22 and 24 is a scale car 26 which travels on tracks 28. The scale car 26, described more in detail hereinafter, receives materials from bins such as bins 22 and 24 spaced along the tracks 28, weighs those materials, and then travels along the tracks 28 to the discharge position shown in FIG. 1 where it is above a skip car 30 adapted to travel up a skip bridge 32 to the receiving hopper at the top of a blast furnace, not shown.

In accordance with usual practice, there are two adjacent tracks on the skip bridge 32 for two interconnected skip cars 30, the arrangement being such that when one of the skip cars travels up the bridge, the other is descending and vice versa. In this manner the weight of one skip car will counterbalance that of the other over the major length of the bridge. Also included in the system of FIG. 1 are coke storage bins 34 adapted to discharge coke into a weigh hopper and coke chute 36, which, in turn, discharges its contents into one or the other of the skip cars 30.

Figure 2:
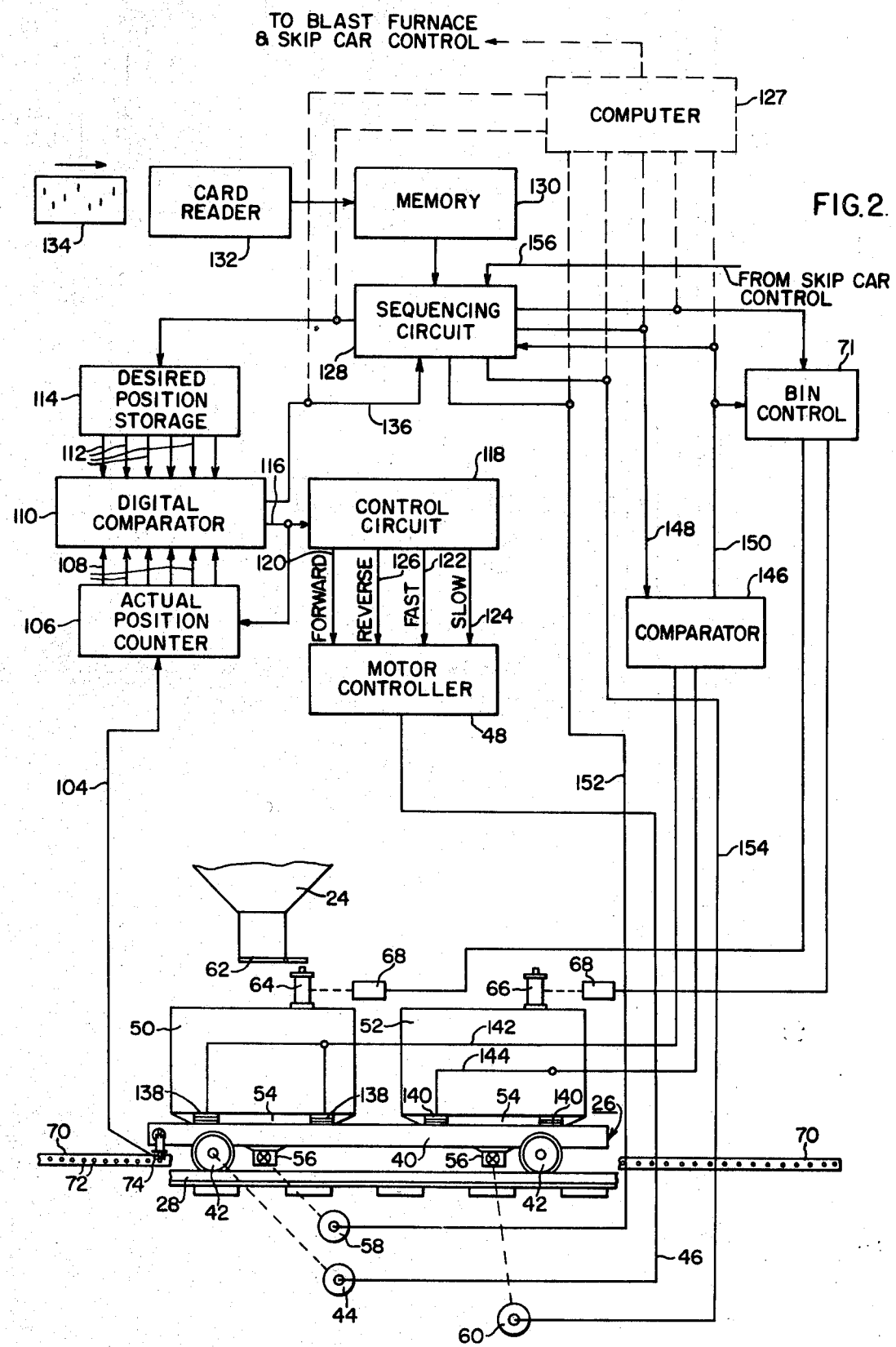
FIG. 2 is a block schematic diagram of the automatic scale car control system of the invention.

With reference now to FIG. 2, one illustrative type of scale car 26 is shown schematically and includes a bed 40 mounted on flanged wheels 42 which travel on the tracks 28. The wheels 42 are driven by means of an electrical drive motor 44 connected through lead 46 to a motor controller circuit 48. Mounted on the bed 40 is a pair of hoppers 50 and 52 each provided with a funnel-shaped bottom which terminates in a suitable discharge valve 56. In the embodiment of the invention shown herein, the discharge valve 56 is shown as being controlled by means of a motor 58; however it should be understood that the discharge valve could be controlled by means of a solenoid, pneumatic system or the like, depending upon its design. Similarly, the discharge valve 56 for bin 52 is controlled by a second motor 60 which, again, may take the form of a solenoid, pneumatic system or the like.

Referring again to FIG. 1, the bins 22 and 24 are above the scale car 26, one of such bins 24 being shown in FIG. 2. The bin 24 is provided with a funnel-shaped bottom having a controllable discharge flap 62 at its lower end which may be opened by means of a pneumatic or hydraulic cylinder 64 carried on the scale car 26 above the bin 50. Similarly, bin 52 is provided with a pneumatic or hydraulic cylinder 66 adapted to open up the discharge opening of a bin above it. The cylinders 64 and 66 are connected through pneumatic or hydraulic control circuits 68 to a bin control circuit 71, hereinafter described in detail. As will be understood, the cylinders 64 and 66 on the scale car 26 could be replaced by controls on the bins 22 and 24 themselves, with equal effectiveness.

Figure 3:
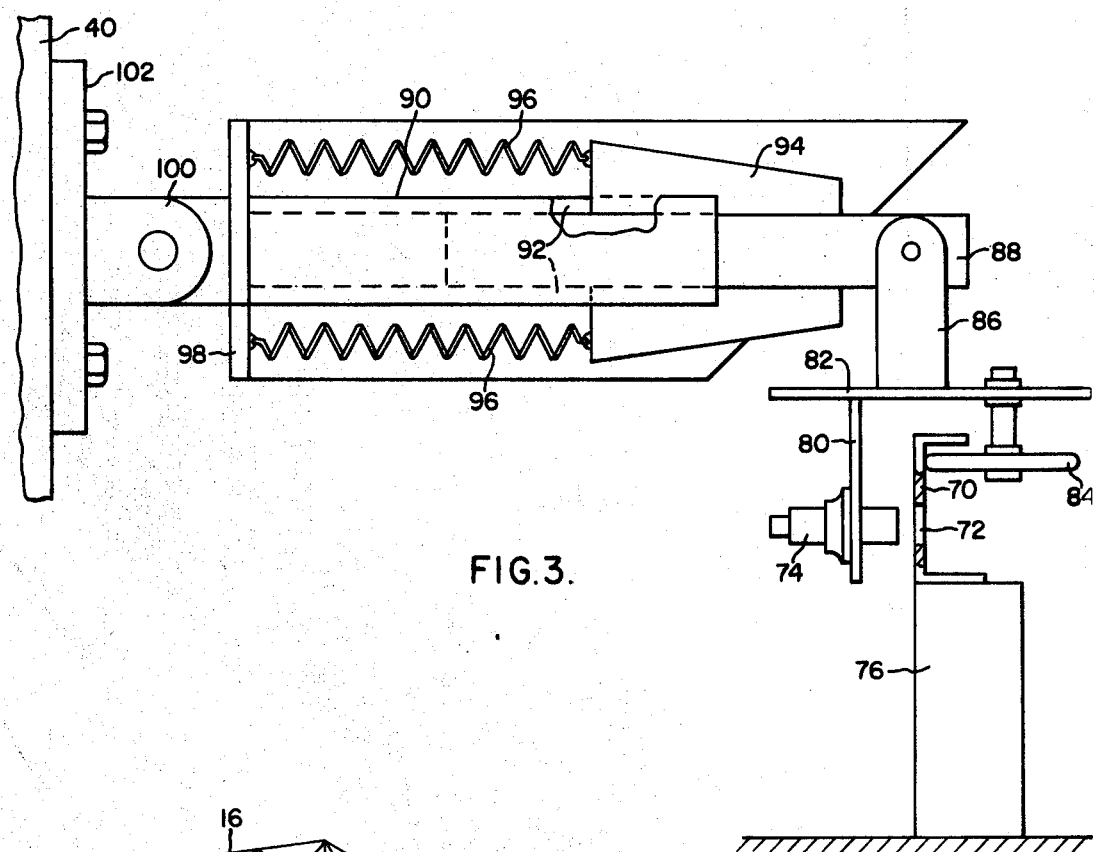
FIG. 3 is an illustration of the mechanical details of the pulse generating system of the invention which produces pulses indicative of the actual position of the scale car.

Extending along the side of the tracks 28 is a rail 70 having openings or holes 72 spaced along its length. Carried on the bed 40 of the scale car 26 and adjacent the holes 72 in rail 70 is an inductive pickup head 74. The details of the rail 70 and the pickup head 74 are shown in FIG. 3. The rail 70 is in the form of a channel and mounted on a support block 76; while the magnetic pickup head 74 is mounted on a flange 80 extending downwardly from plate 82. Carried at the forward end of the plate 82 is a roller 84 which rides on the right face of the rail 70. The plate 82, which carries the pickup head 74 and roller 84, is connected through clevis 86 to a rod 88 which slides within a tubular member 90 having slots 92 which receive flanges 94 welded or otherwise securely fastened to the rod 88. The flanges 94, in turn, are connected through tension springs 96 to a plate 98, the arrangement being such that the tension springs 96 will normally urge the flanges 94, the rod 88 and the roller 84 to the left, thereby urging the roller into snug abutting relationship with the rail 70. At the same time, the springs 96 permit the roller 84 to move inwardly or outwardly due to any uneven rail conditions while maintaining the inductive pickup head 74 at a fixed spacing with respect to the openings 72 in rail 70, regardless of any irregularities in the rail.

The plate 98 is connected through clevis 100 to a plate 102 bolted to the bed 40 of the scale car 26. Hence, as the scale car moves back and forth on the tracks 28, so also will the inductive pickup head 74. Furthermore, since the rail 70 is provided with openings 72, a pulse will be produced by the inductive pickup 74 each time it passes an opening 72 in the rail 70, these openings being spaced uniformly along the length of the rail. In this manner, it will be appreciated that by counting the number of pulses produced by the pickup head 74, the position of the scale car 26 can be determined.

The pulses from the inductive pickup head 74 are applied through lead 104 shown in FIG. 2 to an actual position counter 106. The actual position counter may be of the binary type and is provided with a plurality of output leads 108, each of which has an ON or OFF signal thereon denoting a bit in a binary number. These ON and OFF signals or bits are applied to a digital comparator 110 where they are compared with ON and OFF signals or bits on leads 112 derived from a desired position storage circuit 114. When the bits on leads 112 representing a desired position of the scale car 26 match the bits on leads 108, the output error signal from the digital comparator on lead 116 will be zero.

Let us assume, for example, that when the scale car 26 is in its extreme left-hand position, the count of the counter 106 will be zero; while when the scale car is in its extreme right-hand position, the counter 106 will store its maximum count. Furthermore, the digital comparator 110 is such that when the count of counter 106, indicating the actual position of the scale car 26, is beneath that stored on leads 112, meaning that the scale car is to the left of the desired position, the error signal on lead 116 will be positive. This error signal is fed back to the actual counter 106 to cause it to count up as pulses are received from the inductive pickup head 74 until the count stored in counter 106 matches that on leads 112 and the error signal on lead 116 is zero. Similarly, if the count stored in counter 106 is above that on leads 112, it is known that the scale car 26 is to the right of the desired position as shown in FIG. 2. Under these circumstances, the error signal on lead 116 will be negative, and this negative error signal will cause the actual position counter 106 to count down until the error signal is again zero, meaning that the desired and actual positions of the scale car coincide.

The error signal on lead 116 is applied to a control circuit 118 which, in turn, controls the motor controller 48. If the error signal on lead 116 is positive, for example, the motor controller produces a signal on lead 120 causing the drive motor 44 to move scale car 26 to the right (i.e., in the forward direction). Furthermore, the magnitude of the error signal on lead 116 will produce a signal on either lead 122 or lead 124 causing the motor to drive the scale car either fast or slow. As will be appreciated, when the error signal is of large magnitude, the motor controller 48 will cause the motor 44 to move the scale car at high or fast speed; and as the error signal on lead 116 decreases, indicating that the scale car is approaching the desired position, the control circuit 118, through a signal on lead 124, will cause the motor controller 48 to slow down the drive motor 44 as well as the scale car 26, until it comes to a complete stop when the error signal on lead 116 is zero.

Similarly, if the error signal on lead 116 is negative, the control circuit 118 produces a signal on lead 126 causing the motor controller 48 to rotate motor 44 such that the scale car 26 moves from right to left (i.e., in the reverse direction).

The desired position storage circuit 114 is controlled by a sequencing circuit 128 connected through a memory unit 130 to a punch card reader 132 adapted to receive and read a punch card 134 having indicia thereon indicating the bin or bins to which the scale car should move, and the weights of the materials to be charged into the respective hoppers 50 and 52. It should be understood, however, that the reader 132 could be replaced by a computer program, possibly one which controls the entire blast furnace operation, a magnetic or punched tape, a typewriter input device, or even manual selector switches. The indicia on the card 134 is converted into electrical signals by the card reader 132; and these electrical signals are stored in the memory circuit 130 which, in turn, applies signals to the sequencing circuit 128.

A computer 127 which controls the scale car as well as the entire blast furnace and skip car operation is shown in broken lines in FIG. 2. It will be noted that the computer bypasses the sequencing circuit 128, this function being performed in the computer memory.

Let us assume, for example, that the scale car 26 is to move to a position such as that shown in FIG. 2 where the hopper 50 is beneath the storage bin 24. This information, derived from the punch card 134, causes the sequencing circuit 128 to enter into circuit 114 a count corresponding to the position that the scale car 26 will occupy when hopper 50 is beneath bin 24. Assuming that the scale car is not now beneath the bin 24, the count on leads 112 will not match the count on leads 108 from actual position counter 106; and an error signal will be developed on lead 116 which will cause the scale car 26 to move to the right or left, depending upon the polarity of the error signal 116. As soon as the scale car reaches a position where hopper 50 is beneath bin 24, the error signal on lead 116 will be zero and the scale car will stop.

As soon as the scale car stops, this condition is detected by sequencing circuit 128 by virtue of a connection through lead 136 to the digital comparator 110. When the output of the digital comparator 110 is zero, a signal is applied through lead 136 to sequencing circuit 128. At this point, the sequencing circuit 128 actuates bin control circuit 70 to activate cylinder 64 through the pneumatic or hydraulic control circuit 68. Consequently, the cylinder 64 is pressurized to open the flap valve 62 and permit materials to be charged into hopper 50.

Between bed 40 and the hopper 50 are load cells 138. Similarly, load cells 140 are beneath hopper 52 and between the hopper and the bed 40. Consequently, the load cells 138 will produce a signal on lead 142 proportional to the weight of the material in hopper 50; while the load cells 140 will produce a signal on lead 144 proportional to the weight of the material in hopper 52. The signals on lead 142 and 144 are applied to a comparator 146 where they are compared with signals on lead 148 from sequencing control circuit 128 proportional to the desired weight to be charged into a hopper. When the signal on lead 148 matches that on lead 142, for example, the output of the comparator 146 is zero; and a signal on lead 150 causes the bin control circuit 70 to activate the pneumatic control circuit 68 to lower the piston of cylinder 64, thereby closing the flap valve 62. In this manner, it can be seen that the scale car 26 will be moved to a desired position beneath a particular storage bin; the flap valve at the bottom of that storage bin will be opened and will remain open until the desired weight is charged into the hopper 50 or 52; and thereafter the flap valve will be closed.

The signal on lead 150 is also applied back to the sequencing circuit 128 which is now apprised of the fact that the desired weight has been charged into the hopper 50. At this point, and depending upon the signals in memory circuit 130, the output of desired position storage circuit 114 may be changed to cause the scale car 26 to move to another position where the hopper 52, for example, is beneath a second storage bin, where the foregoing sequence of operations is repeated. That is, the scale car is brought to a stop with the hopper 52 beneath the desired storage bin; the flap valve of that bin is opened by cylinder 66; material is discharged into the hopper 52 until the output of the comparator 146 is zero; and the flap valve at the bottom of the discharging hopper is again closed.

Now, again depending upon the signals in the memory circuit 130, the output of desired position storage unit 114 may again be varied to cause the scale car 26 to move to a position over one or the other of the skip cars 30 as shown in FIG. 1. When this occurs, the output of the digital comparator 110 is again zero; and the sequencing circuit, through lead 152 or 154, will cause either motor 58 or motor 60 to open its associated valve 56 to discharge the contents of hopper 50 or hopper 52 into the skip car 30. The sequencing circuit 128 may be provided with a signal on lead 156 which indicates which one of the two skip cars 30 is at the bottom of the skip bridge 32 and, hence, alters the output of the desired position storage unit 114 such that one or the other of the hoppers 50 or 52 will be over the skip car when its associated valve 56 is opened.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that the plurality of digital signals fed into comparator 110, for example, could be single analogue signals. Hence, as used in the following claims, "signal" means either a plurality of digital signals indicative of a given quantity or a single analogue signal.

I claim:
1. In a system for controlling a scale car reciprocable along a track and adapted to receive materials from a storage bin positioned adjacent the track, transfer those materials to a discharge position along the track, and thereafter automatically discharge those materials at the discharge position, the combination of:
   means for storing an electrical signal indicative of the position of said storage bin along said track to which the scale car is to travel;
   means for producing an electrical signal which varies as a function of the actual position of said scale car along the track;
   means for comparing said stored electrical signal indicative of the position of said bin with said electrical signal which varies as a function of the actual position of said scale car to derive an error signal;
   means responsive to said error signal for moving said scale car to said bin such that said error signal is zero when the scale car is adjacent the bin; and
   means responsive to a zero condition of said error signal for activating said bin to discharge at least a portion of its contents into the scale car.

2. In a system for controlling a scale car reciprocable along a track and adapted to receive materials from a storage bin positioned adjacent the track, transfer those materials to a discharge position along the track, and thereafter discharge those materials at the discharge position, the improvement comprising:
   means for causing said scale car to move to a position along said track adjacent a storage bin;
   means for activating said bin to discharge at least a portion of its contents into the scale car;
   means for producing an electrical signal which varies in proportion to the actual weight of materials charged into the scale car;
   means for storing an electrical signal indicative of the weight of the material which is to be charged into the scale car;
   means for comparing said actual weight signal with said stored weight signal to produce an error signal when the actual and stored weight signals are not the same; and
   means responsive to a zero condition of said error signal for stopping the discharge of materials from said bin into said scale car.

3. A system for controlling a scale car reciprocable along a track and adapted to receive materials from a storage bin positioned adjacent the track, transfer those materials to a discharge position along the track, and thereafter automatically discharge those materials at the discharge position, said system comprising:
   means for storing electrical signal indicative of the position of said storage bin along said track to which the scale car is to travel and the weight of the material which is to be charged into the car from that bin;
   means for producing an electrical signal which varies as a function of the actual position of said scale car along the track;
   means for comparing said stored electrical signal indicative of the position of said bin with said electrical signal which varies as a function of the actual position of said scale car to derive a first error signal;
   means responsive to said error signal for moving said scale car to said bin such that said error signal is zero when the scale car is adjacent the bin;
   means responsive to a zero condition of said first error signal for activating said bin to discharge at least a portion of its contents into the scale car;
   means for producing an electrical signal which varies in proportion to the actual weight of material charged into the scale car;
   means for comparing said actual weight signal with said stored weight signal to produce a second error signal when the actual and stored weight signals are not the same;
   means responsive to a zero condition of said second error signal for stopping the discharge of material from said bin into said scale car; and
   means for thereafter moving said scale car to said discharge position and for automatically discharging said material at the discharge position.

4. The system of claim 3 wherein the means for producing an electrical signal which varies as a function of the actual position of the scale car along the track comprises a pulse generator adapted to produce a pulse each time the scale car moves through a predetermined distance along said track;
   a counter to which pulses produced by said pulse generator are applied;
   means for causing said counter to count up when the scale car moves in one direction; and
   means for causing said counter to count down when the scale car moves in the opposite direction.

5. The system of claim 4 wherein said pulse generator comprises an inductive pickup mounted on said scale car and arranged in close proximity to a metallic rail extending parallel to said track; said rail having equally spaced openings therein such that a pulse will be produced by said inductive pickup each time it passes an opening in said metallic rail.

6. The system of claim 3 wherein said signals indicative of the position of a storage bin along said track to which said scale car is to travel and the weight of the material which is to be charged in the scale car from that bin are derived from a punch card.

7. The system of claim 4 wherein said signal indicative of the position of a storage bin along said track to which said scale car is to travel comprises a plurality of digital signals and said counter produces a plurality of digital signals; and including a digital comparator for comparing said sets of digital signals.

8. The system of claim 3 wherein there are a plurality of storage bins spaced along said track, and said storing means stores electrical signals indicative of the positions of the respective bins along said track.

9. The system of claim 8 wherein said means for moving said scale car moves the scale car to each of the bins in said plurality of bins in sequence.

10. The system of claim 3 wherein the means for activating said storage bin and for stopping the discharge of materials from said bin includes a device for opening and closing a discharge valve at the bottom of the bin.

11. The system of claim 3 wherein the means for producing an electrical signal which varies in proportion to the actual weight of material charged into the scale car includes strain gaps beneath hoppers carried on the scale car which receive materials discharged from a bin.

12. The system of claim 3 wherein the discharge position of said scale car is above one of two skip cars movable on a skip bridge leading to the top of a blast furnace.

13. The system of claim 3 wherein said scale car receives materials to be charged into a blast furnace, and wherein said means for storing electrical signals comprises a computer which also controls the operation of said blast furnace.